Figure 1:
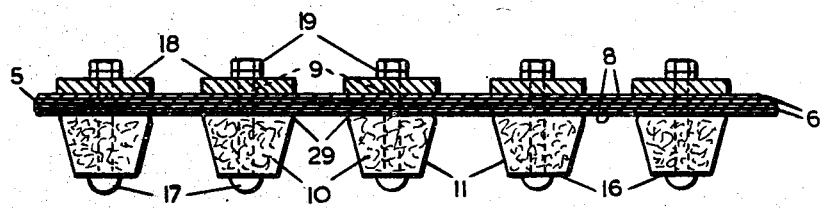

Sept. 2, 1952     T. ELLISON ET AL     2,608,875

POWER TRANSMISSION BELT

Filed Nov. 2, 1949

T. ELLISON
S. G. LEUTY
    *Inventors*

*Attorneys*

Patented Sept. 2, 1952

2,608,875

UNITED STATES PATENT OFFICE 2,608,875

POWER TRANSMISSION BELT

Thomas Ellison and Sydney George Leuty, Spondon, near Derby, England, assignors to British Celanese Limited, a corporation of Great Britain Application November 2, 1949, Serial No. 125,006
In Great Britain November 24, 1948

1 Claim. (Cl. 74—236)

This invention relates to power transmission belts, particularly for variable speed drives, and is especially concerned with V-belts of the type suitable for use in association with smooth-faced expanding V-pulleys to constitute a variable speed drive.

A common form of belt of this type comprises an endless band of leather, balata or multi-ply fabric, which has secured to its inner face by nuts and bolts a series of aluminium or wooden bars or lags, the heads of which project on each side of the band. Secured to the outer faces of the projecting heads by means of rivets are leather pads which make contact with the inner faces of the pulley discs. Each pulley comprises two discs, and the inner face of each disc is in the form of a flat cone, having a semi-vertical angle of the order of 70–80°, and the outer faces of the heads of the bars are inclined, to conform to the faces of the pulley discs. Belts of this form are liable to the disadvantages of frequent breakage, particularly of the transverse bars, and of rapid wear and detachment of the pads, giving rise to unduly high maintenance costs and frequent stoppages in operation. It is an object of the present invention to provide a V-belt in which these disadvantages are overcome or substantially reduced.

According to the present invention a V-belt comprises a band of flexible material and, secured transversely to one face of said band, a spaced series of bars of a cross-section that, throughout their length, is uniform and of a character suitable for frictional engagement with a pulley surface, the ends of said bars projecting beyond the edges of said band and having exposed end surfaces at an angle to the length of each bar for engagement with the conical face of a V-pulley. Belts so constructed are not subject to the disadvantage that a facing material at the ends of the transverse bars is liable to become detached, while breakage of the bars and unduly rapid wear of the ends thereof due to the rigidity of the bars are substantially eliminated.

A suitable material for making the transverse bars is a narrow V-belting, made up of layers of leather sewn or otherwise secured together. Other forms of thick, narrow belting may, however, be employed, for example V-belting made of layers of textile fabric and rubber. The V-belting is cut to suitable lengths which are secured transversely across the flexible band, with their wider faces in contact with the inner face of the band. A jig can be employed for cutting the V-belting material, so that the pieces are all equal in length and their ends are all cut to a correct angle.

As the band to which the transverse bars are secured, the materials used previously, in belts with rigid bars, can be employed, e. g. bands of leather, balata or multi-ply fabric. A flat belting comprising several plies of textile material, united together and externally coated with rubber, is particularly suitable.

The transverse bars can be secured to the band, as in previous arrangements, by means of nuts and bolts, each bar being fastened to the band at two points. To increase the strength of the fastening metal plates, e. g. of mild steel or an aluminium alloy, can be secured on the other side of the band in register with each bar, the bolts securing each bar to the band passing also through the corresponding plate. Joining of the band to make an endless V-belt can be effected by replacing a number of these plates (e. g. two or three on each side of the join) with a piece of material similar to that of the band itself, the ends of the band proper being butted against one another beneath the additional piece of band material.

Figure 2:
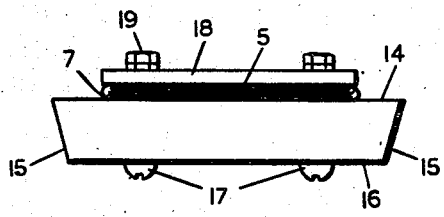
Figure 3:
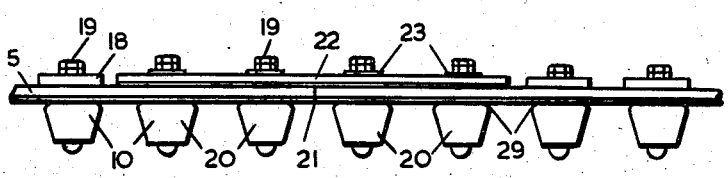
Figure 4:
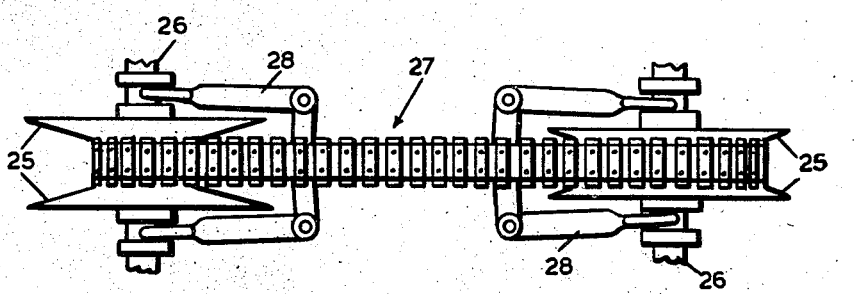

By way of example one form of V-belt in accordance with the present invention, and the manner in which it is to be used, will now be described in greater detail with reference to the accompanying drawings, in which, Figure 1 is a longitudinal section of the belt, Figure 2 is a lateral section of the belt, Figure 3 is a side elevation showing a joint in the belt, and Figure 4 is a diagrammatic plan of a variable speed drive in which the belt is used.

The belt, as shown in Figures 1–3, comprises a band 5 of 4-ply rubberised textile belting having a total thickness of ¼" and a width of 4". The four plies 6 of the belt are united together and externally coated with rubber, the edges of the band at 7 as well as the faces 8 thereof being rubber-covered. The band 5 is drilled at intervals of 2¼" along the length thereof with pairs of holes 9 spaced apart across the width of the band by a distance of 2¾". Secured to one face of the band by means of these holes is a series of transverse bars 10 in the form of narrow lengths of leather V-belting, of maximum width of 1½" and a depth of about 1", the non-parallel faces 11 of the V-belting being at an angle of 40° to each other. The V-belting consists of layers of leather, sufficient in number and thickness to make up the required depth of 1", and stitched together with copper wire. The bars 10 of V-belting are cut to a maximum length of 5½" on the wider face 14, but the ends 15 thereof are cut obliquely at an angle of 72½°, to conform to the angle of the V-pulleys with which the belt is to be used, so that the narrower face 16 of each bar is correspondingly shorter than the wider face 14. Each bar 10 is bored, from the narrower face 16 to the wider face 14, with two ¼" holes, 2¾" apart, and is secured with its wider face 14 against the band 5 by two mild steel round-headed bolts 17 extending through the holes in the V-belting bars 10 and in the band 5. On the upper side of the band 5 is placed a plate 18 of 1½" x ¼" mild steel bar, 4" long, drilled with ¼" holes through which the bolts 17 pass, the bolts being secured by a pair of lock nuts 19 engaging with the face of the mild steel plate 18.

A method of joining together the ends of a piece of belting of the kind described above, so as to make an endless belt, is shown in Figure 3. Two of the mild steel plates 18 at each end of the piece are removed (i. e. over the bars indicated at 20), the ends 21 of the band 5 are butted against one another, and a 10" length 22 of rubberised fabric similar to that of the band 5 itself is substituted for the mild steel plates removed, being suitably bored for the passage of the bolts 17 and secured in position by means of the bolts 17 and lock nuts 19. Washers 23 are placed between the lock nuts 19 and the additional piece of rubberised fabric.

The belt of the present invention is applicable to belt and V-pulley drives generally, but is particularly applicable to variable speed drives of the type in which axially expanding pulleys are used. A drive of this kind is shown diagrammatically in Figure 4, in which two pairs of cones 25 are splined to shafts 26, each pair serving as a pulley for engagement by the endless belt 27. The semi-vertical angle of the cones 25 is 72½°, matching the angle of the ends 15 of the bars 10 of the belt. Levers 28 serve to bring together one pair of cones 25 while expanding the other, so varying the radii at which the belt 27 acts on the two pulleys and varying the speed ratio between the shafts 26. The corners 29 of the bars 10 are rounded off to avoid a tendency for them to cut into the surface of the band 5 when the belt 27 is passing round a small radius.

The belt described above is inexpensive to construct and maintain, and is simple to repair or recondition. The belt runs very quietly and has a very long life without breakage or undue wear. The flexibility of the bars 10 appears to facilitate the passage of the belt round pulleys of small diameter and permits variable speed drives of the type described above to be readily used over their full range of speed ratios.

Having described our invention, what we desire to secure by Letters Patent is:

An endless V-belt comprising a band of flexible material, a spaced series of bars secured by through fastenings transversely to one face of said band, the ends of said band being butted and joined by a piece of similar flexible material secured to the other face of said band by the same fastenings as for at least four of said bars, two on each side of the butt joint and, flat metal plates secured to said other face of said band by the same fastenings as the associated bars, said bars being of a uniform cross-section throughout their length and of a character suitable for frictional engagement with a pulley surface, the ends of said bars projecting beyond the edges of said band and having exposed end surfaces at an angle to the length of each bar for engagement with the conical faces of a V-pulley.

THOMAS ELLISON.
SYDNEY GEORGE LEUTY.

REFERENCES CITED

The following references are of record in the file of this patent:

UNITED STATES PATENTS

| Number | Name | Date |
|---|---|---|
| 720,340 | Fouillaron | Feb. 10, 1903 |
| 1,446,018 | Reeves | Feb. 20, 1923 |

FOREIGN PATENTS

| Number | Country | Date |
|---|---|---|
| 1,372 | Great Britain | 1910 |